United States Patent [19]

Greenberg

[11] 4,061,830

[45] Dec. 6, 1977

[54] SELECTIVE SOLAR ENERGY RECEIVER AND METHOD FOR ITS PRODUCTION

[75] Inventor: Charles B. Greenberg, Murrysville, Pa.

[73] Assignee: PPG Industries, Inc., Pittsburgh, Pa.

[21] Appl. No.: 643,724

[22] Filed: Dec. 23, 1975

[51] Int. Cl.² .................................................. F24J 3/02
[52] U.S. Cl. ................................... 428/469; 427/160; 427/327; 148/6.24; 148/6.27; 106/287 SC; 126/270
[58] Field of Search ............... 427/327, 126, 435, 304, 427/305, 160, 74; 106/286, 287 SC; 126/270; 29/180; 428/469; 148/6.27, 6.14, 6.24

[56] References Cited

U.S. PATENT DOCUMENTS

| | | | |
|---|---|---|---|
| 2,917,817 | 12/1959 | Tabor | 29/180 |
| 3,127,279 | 3/1964 | Baig | 427/435 |
| 3,314,811 | 4/1967 | Mitchell | 427/435 |
| 3,391,012 | 7/1968 | Mitchell | 427/435 |

*Primary Examiner*—Ralph S. Kendall
*Attorney, Agent, or Firm*—Donna L. Seidel; E. Kears Pollock

[57] ABSTRACT

A solar energy receiver comprising an aluminum panel and a coating which comprises a black metal sulfide film having a high solar absorptance but a low thermal emissivity and a method for the production of such a receiver by wet chemical deposition onto an aluminum panel of a metal sulfide film from an alkaline aqueous solution of a salt of a metal, a complexing agent for the metal ions, and a sulfur compound capable of reacting with the metal ions in the presence of aluminum to form a metal sulfide are disclosed.

13 Claims, 2 Drawing Figures

4,061,830

SELECTIVE SOLAR ENERGY RECEIVER AND METHOD FOR ITS PRODUCTION

BACKGROUND OF THE INVENTION

1. Field of the Invention

The present invention relates generally to the art of solar energy collection and more particularly to the art of producing an efficient solar energy receiving surface by wet chemical deposition of a selectively absorbing film.

2. Description of the Prior Art

A large proportion of the solar energy reaching the surface of the earth is in the wavelength range of visible light. It is well known that, in general, light bodies are good reflectors while dark bodies are good absorbers of visible light. For this reason, it has long been a practice in the art of solar energy collection to blacken the surface which receives solar radiation. However, it is also known that dark bodies may be strong radiators of heat. Thus, for the most efficient collection and utilization of solar energy, a surface is needed which is both an excellent absorber of energy in the form of visible light, and a poor radiator of energy in the form of heat; i.e., a selective surface is one which is black with respect to absorption of visible light and white with respect to radiation of heat.

It is another object of the present invention to provide a surface which is a good absorber of incident solar energy but which is not a strong radiator of heat.

It is known in the art to deposit a thin dark metal surface layer on a bright metal base to achieve the aforementioned desirable combination of properties. A well-known method for making such a selective composite surface is disclosed in U.S. Pat. No. 2,917,817 to Tabor. The method involves immersing the metal base as a cathode into an aqueous electrolytical bath of nickel sulfate, zinc sulfate, ammonium sulfate, ammonium thiocyanate and citric acid. By electrodeposition, a black coating is deposited on the base. The composite solar energy receiver thus produced has a high solar energy absorptance and a low thermal emissivity when compared with an ideal black body.

However, it is a further object of this invention to provide a selective solar energy absorbing surface by a method which is rapid, simple, and inexpensive, not requiring electroplating equipment.

Wet chemical methods are well-known in the art for producing coatings of metals, metal oxides and metal sulfides, some of which are black. U.S. Pat. No. 3,314,811 to Mitchell et al. discloses a composition for blackening aluminum at room temperature by conventional immersion techniques which do not require applied current. The composition disclosed by Mitchell et al. comprises two blackening combinations. The first combination includes a compound containing ionizable chloride to etch the surface and a salt or acid of molybdenum to deposit black molybdic oxide. The second combination includes a metal salt and a sulfur-bearing compound which react together to form a black or grey reaction product. Following the teachings of Mitchell in the above patent, a coating has been deposited which comprises a mixture of molybdic oxide and a metal sulfide. The coating is black and adherent as claimed, but measurements of solar properties reveal a high solar energy absorptance and a concomitantly high thermal emmisivity, making the coated surface inefficient for solar energy collection.

The present invention provides a rapid, simple and inexpensive electroless method for producing a solar energy absorbing coating having high solar energy absorptance and the desired low thermal emissitivy.

SUMMARY OF THE INVENTION

A solar energy receiving surface is produced by cleaning an aluminum substrate and contacting the bright metal surface with an alkaline aqueous solution of at least one metal salt, a complexing agent for the metal of the salt, and a sulfur compound capable of reacting with the metal of the salt to form a dark reaction product on the surface of the aluminum.

The metal salts useful in the practice of the present invention are such water soluble salts as the sulfates, nitrates and chlorides of such metals as nickel, copper, silver, zinc, cadmium, cobalt, lead, tin, and iron. Complexing agents useful in the practice of the present invention include ammonium hydroxide, sodium potassium tartrate, sodium oxalate, sodium gloconate and combinations thereof. The choice of complexing agent depends on the choice of metal salts and the desired properties of the coating. The sulfur compound chosen for use in the practice of the present invention must be capable of reacting with the metal of the selected salt to form a dark reaction product on the surface of the aluminum substrate. The following reaction sequence is proposed, in order to illustrate the required reactivity of the sulfur compound.

Cation exchange occurs between the aluminum substrate and the complexed metal ions in the solution. The aluminum ions which replace the metal ions in solution then react with hydroxide ions in solution to form an aluminum hydroxide gel at the surface of the substrate. The gel catalyzes the reaction of other aluminum ions with the sulfur compound to liberate hydrogen sulfide which then reacts with the metal ions in solution to form a metal sulfide film on the surface of the substrate.

DETAILED DESCRIPTION OF THE PREFERRED EMBODIMENTS

An aluminum substrate to be coated is cleaned and rinsed with water. The substrate is then contacted with a coating composition comprising a metal salt, a sulfur compound, and a complexing agent. The sulfur compound may be in a separate solution applied subsequently but preferably all the essential components are present in a single solution. The preferred metal salts are the sulfates and nitrates of nickel and zinc. Sodium thiosulfate is the preferred sulfur compound. Complexing agents useful in the present invention include ammonium hydroxide, sodium potassium tartrate, sodium oxalate and sodium gluconate. It is preferred that ammonium hydroxide is present in all coating compositions. Ammonium hydroxide is used herein refers to a 28 to 30 percent aqueous solution of ammonium hydroxide. The choice of an additional complexing agent, if any, depends on the metal salt used and the desired composition of the coating. A most preferred complexing system for use with a nickel salt to form a black nickel sulfide coating is a combination of ammonium hydroxide and sodium potassium tartrate. The pH of the solution may be adjusted to about 12 with a common alkali, sodium hydroxide being preferred.

After about 2 to 15 minutes contact with the coating solution, preferably by immersion, the substrate is uniformly coated with a gray to black coating comprising metal sulfide. The appearance, adherence, absorptance and emissivity properties of the coated substrates vary according to the composition of the coating.

Figure 1:
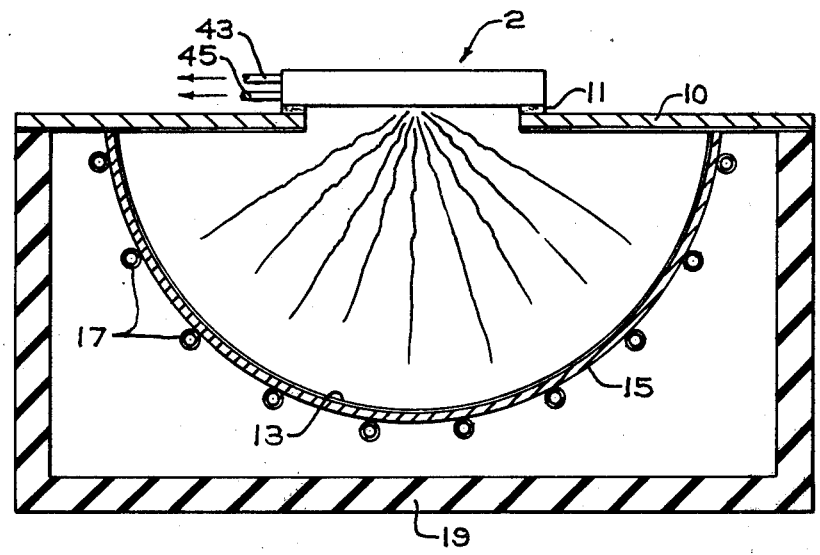
FIG. 1 is a cross-sectional view of a Model Solar Calorimeter as described in "Thermal Gradient Model Solar Calorimeter", ASHRAE (American Society of Heating, Refrigerating and Air Conditioning Engineers, Inc.) Transactions, Vol. 72, Part I, p. 62-71 (1966), as it is adapted for measuring the thermal emissivity of a solar energy receiving surface. The heated sample assembly 2 is supported by an aluminum foil lined plate 10 over the opening of the Model Solar Calorimeter. Insulation 11 reduces heat transfer by conduction between the sample and the Calorimeter. Thermal energy emitted from sample assembly 2 is incident upon heat metering surface 13 which is comprised of a plurality of heat flow meter strips. Each strip consists of copper-constantan thermocouple foil with an interlayer of laminated plastic. The heat metering surface 13 is bonded to a copper casing 15 to which are soldered copper cooling tubes 17. The cooling tubes 17 are spaced to provide a uniform inner surface temperature. The calorimeter apparatus is self-contained in box 19.
Figure 2:
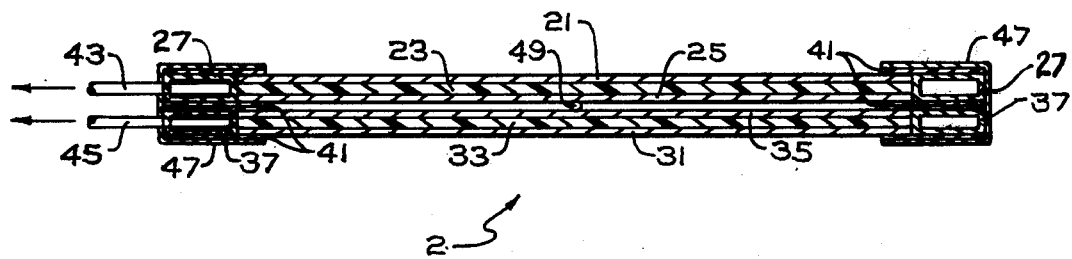
FIG. 2 is a cross-sectional view of heated sample assembly 2. Good physical contact between sample 21 and electrical heater 23 is maintained by sealing sample 21 and aluminum foil 25 to frame 27 with pieces of tape 41 and evacuating the enclosed space through vacuum line 43. Similarly reference 31 and aluminum foil 35 are sealed to frame 37 with pieces of tape 41. The enclosed space is likewise evacuated through vacuum line 45 to maintain good physical contact between reference 31 and electrical heater 33. For convenience, the two frames are held together with a lead foil tape 47. Heaters 23 and 33 are maintained at operating temperature by temperature control thermocouple 49.

The coated substrates are analyzed with a Beckman Model DK-2A Spectroreflectometer which measures the spectral reflectance of the samples. The spectral curves so obtained cover the range of wavelengths between 300 and 2200 nanometers, which represents about 98 percent of total incident solar energy. The absorptance of a sample is calculated by subtracting the reflectance from unity. (The transmittance is presumed to be zero). The coated substrates are then analyzed with a Model Solar Calorimeter modified as shown in FIG. 1. A sample is heated and placed over the opening in the Model Solar Calorimeter. After 45 seconds (the time constant of the Calorimeter) the output of the heat metering surface is read. The output measurements are compared for an aluminum foil (emissivity of 0.1), a flat black painted surface (emissivity of 0.9) and the sample. The emissivity of a sample is calculated assuming a linear relationship between emissivity and output. The emissivity values of the samples herein are determined at 150° F. (62.2° C.), a normal operating temperature ffor solar collector surfaces. The coated substrates which are most useful as solar energy receiving surfaces are characterized by a solar absorptance greater than 0.95 and a thermal emissivity less than 0.45.

The invention may be further appreciated in terms of solution composition, coating composition and coating characteristics, from the descriptions of specific examples which follow.

EXAMPLE I

A 4-inch (100 millimeters) square aluminum panel is prepared for coating by conventional pretreatment at room temperature which consists of sequential alcohol, alkaline and acid washes each followed by a tap water rinse. No drying is necessary. The panel is then immersed in a solution having the following composition.

4.0 grams nickel sulfate ($NiSO_4 \cdot 6H_2O$)
5.0 grams sodium thiosulfate ($Na_2S_2O_3 \cdot 5H_2O$)
50 cc ammonium hydroxide ($NH_4OH$)
1 liter deionized water ($H_2O$)

After immersion for about 5 minutes, the aluminum panel is uniformly coated with an adherent matte gray film. X-ray diffraction analysis indicates that $Ni_3S_2$ is a major component of the film. The solar absorptance is 0.90 and the emissivity is 0.53.

EXAMPLE II

A panel is treated as in Example I and immersed in a solution having the following composition:

2.0 grams nickel sulfate ($NiSO_4 \cdot 6H_2O$)
2.0 grams silver nitrate ($AgNO_3$)
5.0 grams sodium thiosulfate ($Na_2S_2O_3 \cdot 5H_2O$)
50 cc ammonium hydroxide ($NH_4OH$)
1 liter deionized water ($H_2O$)

Three minutes immersion is sufficient to coat the panel with a matte black film which is less selective than the nickel sulfide film of Example I.

EXAMPLE III

A panel is treated as in Example I and immersed in a solution comprising 4.0 grams of copper sulfate ($CuSO_4 \cdot 5H_2O$) and 40 cc of ethylenediamine per liter of water. After 12 minutes immersion, the panel is rinsed and dried with air. The panel is then immersed for about 5 minutes in an aqueous solution which comprises 10.0% ammonium polysulfide. The coated panel has a solar absorptance of 0.97 and an emissivity of 0.42.

EXAMPLE IV

A panel is treated as in Example I and immersed in a solution comprising the following:

2.0 grams nickel sulfate ($NiSO_4 \cdot 6H_2O$)
2.0 grams zinc nitrate ($Zn(No_3)_2 \cdot 6H_2O$)
5.0 grams sodium thiosulfate ($Na_2S_2O_3 \cdot 5H_2O$)
50 cc ammonium hydroxide ($NH_4OH$)
1 liter deionized water ($H_2O$)

Immersion of the panel for approximately 10 minutes results in a film having a bluish coloration suggestive of interference colors and very similar in appearance to the well-known "nickel-black" selective coating made by electroplating as described in the discussion of the prior art.

EXAMPLE V

A panel, treated as in Example I, is immersed in the solution of Example IV with the exception that 2.0 grams of zinc nitrate $Zn(NO_3)_2 \cdot 6H_2O$ is substituted for the 2.0 grams of nickel sulfate so that the solution contains no nickel. After immersion for about 10 minutes, the panel is coated with a gray-black film which comprises zinc sulfide, and which is less adherent than the film of Example IV which contains nickel.

EXAMPLE VI

A panel is treated as in Example I and immersed in a solution which comprises the following:

4.0 grams nickel sulfate ($NiSO_4 \cdot 6H_2O$)
5.0 grams sodium thiosulfate ($Na_2S_2O_3 \cdot 5H_2O$)
10.0 grams sodium potassium tartrate ($KNaC_4H_4O_6 \cdot 4H_2O$)
20.0 cc ammonium hydroxide ($NH_4OH$)
1 liter deionized water ($H_2O$)

The pH of the solution is adjusted to about 12 by addition of approximately one gram of sodium hydroxide (NaOH). After 5 minutes immersion, the panel is uniformly coated with a black film which comprises $Ni_3S_2$. The solar absorptance is 0.96 and the emissivity is 0.32.

EXAMPLE VII

A panel is treated with the coating composition as in Example VI. After immersion for 10 minutes, the panel is uniformly coated with a black film comprising $Ni_3S_2$. The solar absorptance is 0.98 and the emissivity is 0.53.

The above examples are offered to illustrate the present invention. However, the invention is not limited by these examples but includes all of the variations and modifications falling within the scope of the claims.

I claim:

1. A method for producing a solar energy receiving surface comprising the steps of:
   a. cleaning a surface of an aluminum substrate; and
   b. contacting the surface of the substrate with an alkaline coating solution consisting essentially of:
      a water soluble salt of a metal selected from the group consisting of nickel, zinc, silver, cadmium, copper cobalt, lead, tin, iron, and combinations thereof;
      a complexing agent for the selected metal;
   a sulfur compound capable of reacting with the selected metal to form a sulfide; and
      water
   to form a uniform metal sulfide coating.

2. The method according to claim 1, wherein the sulfur compound is sodium thiosulfate.

3. The method according to claim 2, wherein the complexing agent is ammonium hydroxide.

4. The method according to claim 3, wherein the water soluble salt is selected to include a nickel salt.

5. The method according to claim 1, wherein the solution comprises:
   a. 1 to 10 grams per liter of water of a metal salt selected from the group consisting of the sulfates and nitrates of nickel, silver, zinc and mixtures thereof;
   b. 10 to 150 cc per liter of water of ammonium hydroxide;
   c. 1 to 15 grams per liter of water of sodium thiosulfate; and
   d. water.

6. The method according to claim 5, wherein the metal salt is nickel sulfate and the solution further comprises a second complexing agent selected from the group consisting of alkali metal tartrates, oxalates and gluconates.

7. The method according to claim 6, wherein the second complexing agent is sodium potassium tartrate.

8. The method according to claim 7, wherein the substrate is contacted with the solution at a temperature between 50° F. and 130° F. for a period between 1 and 30 minutes.

9. An article of manufacture produced according to the method of claim 5.

10. An article of manufacture produced according to the method of claim 8.

11. An article of manufacture produced according to the method of claim 8, wherein the solar absorptance of a surface of the article is greater than 0.95 while the thermal emissivity of the same surface is less than 0.45.

12. A coating composition for the wet chemical deposition of metal sulfide films in the presence of aluminum which consists essentially of:
   a. 1 to 10 grams per liter of a metal salt selected from the group consisting of nickel sulfate, silver nitrate, zinc nitrate, and combinations thereof;
   b. 10 to 150 cubic centimeters per liter of ammonium hydroxide;
   c. 1 to 15 grams per liter of sodium thiosulfate; and
   d. water.

13. The composition as recited in claim 12, wherein the metal salt is nickel sulfate and wherein the composition further comprises 2 to 30 grams per liter of sodium potassium tartrate.

* * * * *